United States Patent
Morikawa (10) Patent No.: US 9,706,070 B2
(45) Date of Patent: Jul. 11, 2017

(54) IMAGE READING APPARATUS, IMAGE READING METHOD, AND COMPUTER PROGRAM

(71) Applicant: CANON KABUSHIKI KAISHA, Tokyo (JP)

(72) Inventor: Daisuke Morikawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/664,525

(22) Filed: Mar. 20, 2015

(65) Prior Publication Data

US 2015/0281490 A1 Oct. 1, 2015

(30) Foreign Application Priority Data

Apr. 1, 2014 (JP) .................................. 2014-075298

(51) Int. Cl.
*H04N 1/46* (2006.01)
*H04N 1/00* (2006.01)

(52) U.S. Cl.
CPC ..... *H04N 1/00771* (2013.01); *H04N 1/00689* (2013.01); *H04N 1/00708* (2013.01); *H04N 1/00724* (2013.01); *H04N 1/00726* (2013.01); *H04N 1/00748* (2013.01); *H04N 1/00777* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 4,633,405 A * | 12/1986 | Ito | ........................... | G03G 15/50 399/87 |
| 4,766,404 A * | 8/1988 | Ishida | ..................... | G03G 15/36 178/18.01 |
| 5,192,977 A * | 3/1993 | Kaneko | ................... | G03G 15/01 399/223 |
| 5,210,547 A * | 5/1993 | Watanabe | ............ | G06K 15/028 346/134 |
| 5,257,081 A * | 10/1993 | Kato | ...................... | G03G 15/50 270/32 |
| 5,329,345 A * | 7/1994 | Nagatani | .............. | G03G 15/602 399/363 |
| 5,499,091 A * | 3/1996 | Kasiwabara | ......... | G03G 15/234 399/18 |

(Continued)

FOREIGN PATENT DOCUMENTS

JP H11-194676 7/1999

*Primary Examiner* — Madelein Nguyen
(74) *Attorney, Agent, or Firm* — Fitzpatrick, Cella, Harper & Scinto (57) ABSTRACT

The image reading apparatus includes a reading unit configured to read the image of the original placed on the platen glass. The image reading apparatus determines whether the original is on the platen glass or not. If it is determined that the original is on the platen glass, the image reading apparatus determines whether the original is blank or not based on the image read by the reading unit. If it is determined that the original is not on the platen glass, or if it is determined that the original is blank, the image reading apparatus notifies the user that the original is not on the platen glass or the original is blank.

9 Claims, 10 Drawing Sheets

(56) References Cited

U.S. PATENT DOCUMENTS

| | | | | |
|---|---|---|---|---|
| 5,513,017 A * | 4/1996 | Knodt | G03G 15/50 | 358/471 |
| 6,516,157 B1 * | 2/2003 | Maruta | G03G 21/02 | 399/79 |
| 6,600,579 B1 * | 7/2003 | Kumagai | H04N 1/00002 | 358/461 |
| 6,750,990 B1 * | 6/2004 | Ohashi | H04N 1/00002 | 358/471 |
| 7,822,378 B2 * | 10/2010 | Yamada | B26D 1/205 | 399/361 |
| 8,374,521 B2 * | 2/2013 | Nishikawa | G03G 15/55 | 399/82 |
| 9,022,388 B2 * | 5/2015 | Nonaka | B65H 29/60 | 271/288 |
| 9,132,679 B1 * | 9/2015 | Mutsuno | B41J 29/38 | |
| 2004/0212825 A1 * | 10/2004 | Sai | G03G 15/50 | 358/1.15 |
| 2005/0046657 A1 * | 3/2005 | Seki | B41J 11/0095 | 347/19 |
| 2006/0215230 A1 * | 9/2006 | Borrey | H04N 1/40 | 358/448 |
| 2006/0215231 A1 * | 9/2006 | Borrey | G06K 9/3208 | 358/448 |
| 2007/0146818 A1 * | 6/2007 | Horiguchi | H04N 1/00681 | 358/474 |
| 2007/0206211 A1 * | 9/2007 | Okutsu | G03G 15/50 | 358/1.14 |
| 2007/0291286 A1 * | 12/2007 | Utsunomiya | G03G 15/5062 | 358/1.8 |
| 2008/0002240 A1 * | 1/2008 | Suga | H04N 1/0414 | 358/474 |
| 2008/0123126 A1 * | 5/2008 | Harris | B41J 11/0075 | 358/1.14 |
| 2008/0137118 A1 * | 6/2008 | Matsutani | H04N 1/4072 | 358/1.9 |
| 2009/0116738 A1 * | 5/2009 | Kubota | G06T 7/408 | 382/165 |
| 2009/0141307 A1 * | 6/2009 | Slijp | H04N 1/00225 | 358/1.15 |
| 2009/0190146 A1 * | 7/2009 | Xu | H04N 1/00681 | 358/1.9 |
| 2009/0225359 A1 * | 9/2009 | Ohkawa | G03G 15/6552 | 358/1.15 |
| 2009/0226230 A1 * | 9/2009 | Ohkawa | G03G 15/50 | 399/408 |
| 2010/0053682 A1 * | 3/2010 | Gotoh | H04N 1/00411 | 358/1.15 |
| 2010/0157381 A1 * | 6/2010 | Chen | H04N 1/00689 | 358/449 |
| 2010/0182618 A1 * | 7/2010 | Akiyama | H04N 1/00795 | 358/1.9 |
| 2010/0201995 A1 * | 8/2010 | Yoshida | H04N 1/00355 | 358/1.2 |
| 2010/0271645 A1 | 10/2010 | Nakabayashi | | 358/1.9 |
| 2010/0329704 A1 * | 12/2010 | Tachibana | G03G 15/553 | 399/27 |
| 2011/0043870 A1 * | 2/2011 | Watanabe | H04N 1/00241 | 358/474 |
| 2011/0075187 A1 * | 3/2011 | Imine | H04N 1/00482 | 358/1.14 |
| 2011/0194861 A1 * | 8/2011 | Shiraishi | B65H 26/02 | 399/21 |
| 2012/0002252 A1 * | 1/2012 | Kubo | G03G 15/60 | 358/498 |
| 2012/0081761 A1 * | 4/2012 | Nakamura | H04N 1/00803 | 358/474 |
| 2012/0120432 A1 * | 5/2012 | Hirohata | H04N 1/00474 | 358/1.13 |
| 2012/0147398 A1 * | 6/2012 | Iguchi | B41J 2/32 | 358/1.9 |
| 2013/0027756 A1 * | 1/2013 | Yamada | H04N 1/00708 | 358/448 |
| 2013/0128305 A1 * | 5/2013 | Grabkowitz | H04N 1/00225 | 358/1.15 |
| 2013/0135637 A1 * | 5/2013 | Ohira | G06T 5/002 | 358/1.9 |
| 2014/0126018 A1 * | 5/2014 | Sugimoto | G06F 3/013 | 358/1.15 |
| 2014/0192386 A1 * | 7/2014 | Ishida | H04N 1/00689 | 358/449 |
| 2014/0204433 A1 * | 7/2014 | Koyama | H04N 1/00909 | 358/496 |
| 2014/0300938 A1 * | 10/2014 | Oosaki | H04N 1/00655 | 358/498 |
| 2014/0320934 A1 * | 10/2014 | Muraishi | H04N 1/00803 | 358/453 |
| 2014/0333971 A1 * | 11/2014 | Macciola | G06K 9/3208 | 358/3.24 |
| 2014/0368895 A1 * | 12/2014 | Teramoto | H04N 1/00824 | 358/498 |
| 2015/0015917 A1 * | 1/2015 | Hirohata | H04N 1/00432 | 358/3.24 |
| 2015/0022835 A1 * | 1/2015 | Mori | G06K 15/16 | 358/1.12 |
| 2015/0070729 A1 * | 3/2015 | Osada | H04N 1/38 | 358/1.18 |
| 2015/0070736 A1 * | 3/2015 | Yoneyama | H04N 1/00023 | 358/504 |
| 2015/0116783 A1 * | 4/2015 | Numata | H04N 1/00411 | 358/3.27 |
| 2015/0156371 A1 * | 6/2015 | Yokomizo | H04N 1/38 | 358/452 |
| 2015/0181064 A1 * | 6/2015 | Yabuuchi | H04N 1/00803 | 358/406 |
| 2015/0234304 A1 * | 8/2015 | Nagata | G03G 9/08755 | 430/105 |
| 2015/0249762 A1 * | 9/2015 | Ishida | H04N 1/00713 | 358/497 |
| 2015/0288838 A1 * | 10/2015 | Tanaka | H04N 1/00742 | 358/474 |
| 2015/0326743 A1 * | 11/2015 | Yabuuchi | H04N 1/00708 | 358/498 |
| 2016/0352925 A1 * | 12/2016 | Koda | H04N 1/00037 | |
| 2016/0352944 A1 * | 12/2016 | Koda | H04N 1/00689 | |

* cited by examiner

| MAIN SCANNING SIZE DETERMINATION RESULT | ORIGINAL DETECTION SENSOR DETERMINATION RESULT | |
|---|---|---|
| | ORIGINAL PRESENT | ORIGINAL ABSENCE |
| B5R, B6 | B5R | B6 |
| A4R, A5 | A4R | A5 |
| B5, B4 | B4 | B5 |
| A4, A3 | A3 | A4 |

IMAGE READING APPARATUS, IMAGE READING METHOD, AND COMPUTER PROGRAM

BACKGROUND OF THE INVENTION

Field of the Invention

The present disclosure relates to an image reading apparatus such as a scanner and the like for reading an original image.

Description of the Related Art

An image reading apparatus reads an original image from, for example, an original placed on an platen glass. The original is directly placed on the platen glass by a user. In addition, the original is sometimes conveyed and placed onto the platen glass by an automatic document feeder (ADF) one by one. The ADF conveys the original stacked on an original tray onto the platen glass. If the original is not placed on the original tray, the image reading apparatus determines that the original is on the platen glass and performs reading of the original. If the original is not placed on the original tray and the user is not placed the original on the platen glass, the image reading apparatus starts reading even if there is nothing on the platen glass. In this case, the image reading apparatus reads a white pressing plate of the platen glass as a blank sheet.

Japanese Patent Application Laid-open No. H11-194676 discloses an image forming apparatus. In the image forming apparatus, in a case where a predetermined time elapses after the platen glass is closed in the absence of an original on the original tray, even an instruction to read the original is given, reading is not performed. The image forming apparatus determines that the user failed to place the original on the platen glass if the original is not placed on the original tray and a predetermined time elapsed after the platen glass is closed. Due to this, the execution of any useless copy is inhibited.

When two or more sheets of the original is read by the ADF, a user may mistakenly mix a blank original. Further, a user may mistakenly reverse a front and rear of the original. In such cases, a blank original, which is unnecessary to read, is read. When the original is read and stored as an image file, the image file includes a blank original, which is unnecessary to read. Further, the image file including a blank original is stored as one file. As a result, file capacity increases. Also, an undesired blank page is included in the contents of the image file, thereby the image file is configured with decreased readability.

Therefore, it is necessary to determine presence/absence of printing on the original. If the original is determined to have no printing thereon (i.e., the original is blank), it is necessary to inhibit reading or to prevent the blank original from storing in a file. For example, US Patent Application Publication No. US2010/0271645 discloses an image reading apparatus. The image reading apparatus generates an electronic file obtained by computerizing the read original images in a page unit. The image reading apparatus determines whether the read original images are blank or not for every read page. If the read original images are blank, the image reading apparatus generates an electronic file in which such blank pages are eliminated.

In the image forming apparatus as disclosed in Japanese Patent Application Laid-open No. H11-194676, when, for example, after placing the original on the platen glass and a predetermined time elapses thereafter to refill output sheet and the like, reading of the original is not performed. In this case, a user is required to open and close the platen glass again etc., which decreases the user's work efficiency. The image reading apparatus as disclosed in US Patent Application Publication No. US2010/0271645 assumes that an original must be placed on an platen glass. Therefore, even if the original is not placed, blank determination processing is performed. Therefore, efficiency is decreased. Also, when a user mistakenly reverses front and rear of the original, the image reading apparatus may read a blank sheet. Therefore, an image reading apparatus which inhibits decrease of work efficiency even when the original is blank or the original is failed to be placed, is needed.

SUMMARY OF THE INVENTION

According to an aspect of the present disclosure, an image reading apparatus includes: a reading unit configured to read an image of an original placed on an platen glass; a determination unit configured to determine presence/absence of the original on the platen glass; a blank determination unit configured to determine, after it is determined by the determination unit that the original is on the platen glass, whether the original is blank or not based on the image read by the reading unit; and a notification unit configured to notify a user that the original is not on the platen glass or the original is blank when it is determined by the determination unit that the original is not on the platen glass or when it is determined by the blank determination unit that the original is blank.

Further features of the present invention will become apparent from the following description of exemplary embodiments (with reference to the attached drawings).

DESCRIPTION OF THE EMBODIMENTS

Now, an embodiment of the present invention is described in detail with reference to the accompanying drawings. Note that a configuration of the apparatus or determination procedure of reading position described in the embodiment is simply an example. Therefore, not limited to this, other configuration or determination procedure may be adopted.

[First Embodiment]

<Configuration>

Figure 1:
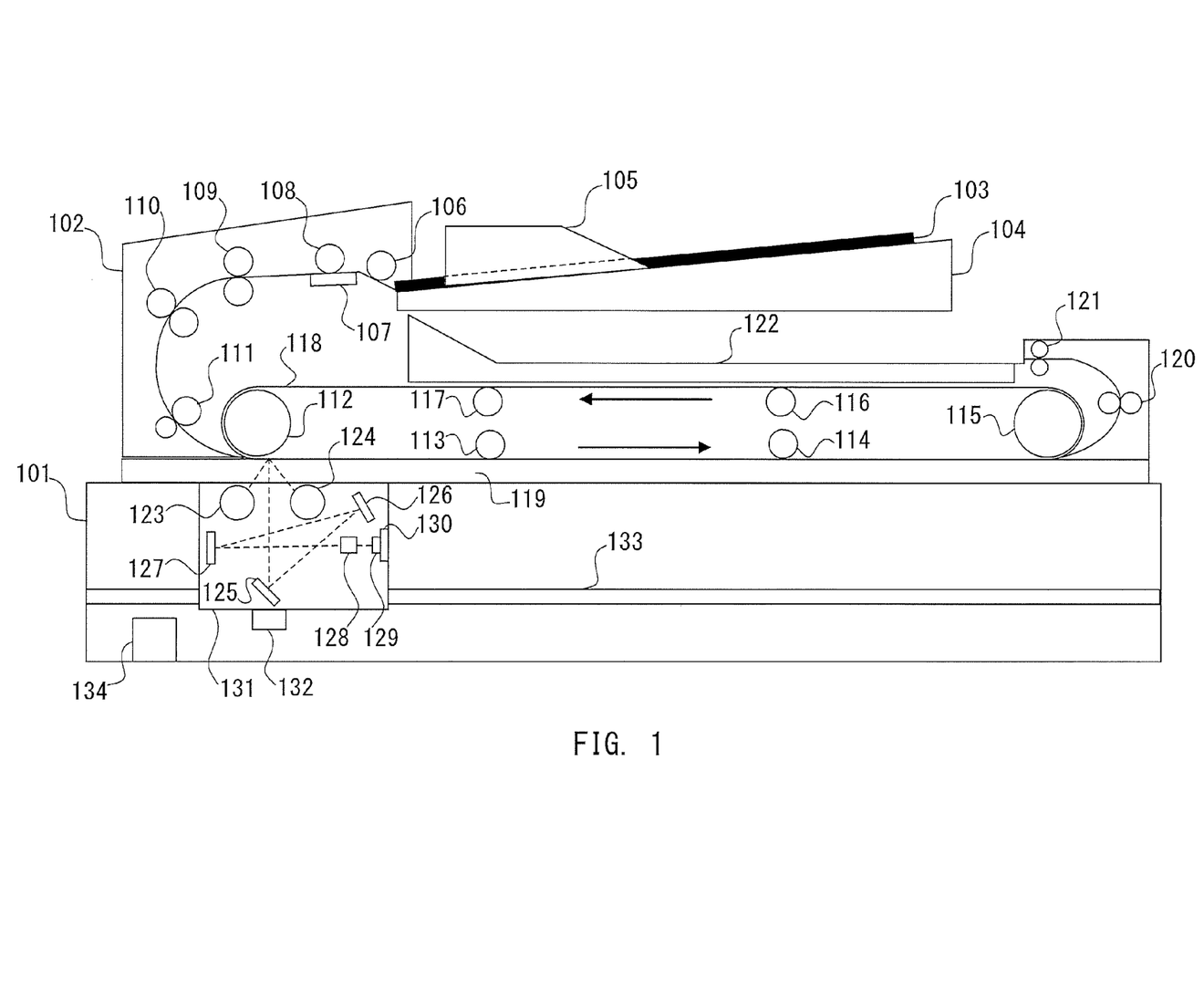
FIG. 1 is a diagram illustrating an internal configuration of an image reading apparatus.

FIG. 1 is a diagram illustrating an internal configuration of an image reading apparatus. The image reading apparatus comprises a reader unit 101, an ADF 102, and an original tray 104. The reader unit 101 is to read an original image from the original. The ADF is to convey the original. The original tray 104 is where an original bundle 103, which is a bundle of one or more originals, is placed. A regulation plate 105, to which the original bundle is contacted, is provided on the original tray 104 in a width direction of the original bundle 103. A direction which is orthogonal to an original conveyance direction is the width direction of the original bundle 103. The regulation plate 105 prevents the original from being obliquely conveyed. In the image reading apparatus, the original is conveyed and placed by the ADF 102 one by one from the original bundle 103 stacked on the original tray 104 onto the platen glass 119. The ADF 102 is openably/closably provided to the platen glass 119. When the ADF 102 is in an open state, a user can directly place the original on the platen glass 119. The reader unit 101 reads the original image from the original placed on the platen glass 119.

The ADF 102 takes in the original one by one from the original tray 104 by a pickup roller 106, a separation pad 107, and a separation roller 108. The original as taken in, which is obliquely conveyed, is corrected by a first resist roller 109. Then, the ADF conveys the original onto the platen glass 119, passing through a second resist roller 110 and a first conveyance roller 111 in order.

The ADF 102 conveys the original on the platen glass 119 by a conveyance belt 118 which is driven in an arrow direction shown in FIG. 1. The conveyance belt 118 is driven by conveyance belt driving rollers 112 and 115, and driven rollers 113, 114, 116, and 117. When the original is conveyed to a predetermined position on the platen glass 119, the ADF 102 stops driving the conveyance belt 118. At this position, the original image of the original is read.

After the original image is read, the ADF 102 resumes driving the conveyance belt 118. The ADF 102 removes the original having the original image thereof read from the platen glass 119 by the conveyance belt 118. Then, the ADF 102 delivers the original to the original delivery tray 122 by the second conveyance roller 120 and a third conveyance roller 121.

The reader unit 101 comprises a reading unit 131. The reading unit 131 moves along a rail 133 by a motor (not shown). Moving from left to right in FIG. 1 along the rail 133, the reading unit 131 reads the original image of the original placed on the platen glass 119. A home position sensor 134 is provided on a bottom surface of the reader unit 101. A rib 132 is provided on a lower part of the reading unit 131, which enables to determine a position to start reading with reference to the home position sensor 134.

The reading unit 131 comprises light sources 123 and 124, reflection mirrors 125 to 127, an imaging lens 128, a line sensor 129, and a signal processing board 130. The line sensor 129 and the signal processing board 130 are integrally formed. The light sources 123 and 124, the reflection mirrors 125 to 127, the imaging lens 128, the line sensor 129, and the signal processing board 130 are fixed to the reading unit 131 by a housing (not shown).

In the reading unit 131, the original placed on the platen glass 119 is irradiated by the light sources 123 and 124. Then, the reflected and scattered light is guided to the imaging lens 128 through the reflection mirrors 125 to 127. The light converged by the imaging lens 128 is formed in the line sensor 129, where an imaging element such as CCD is arranged on line. The formed light is converted into an analog electric signal by the line sensor 129. The signal processing board 130 converts the light converted into the analog electric signal by the line sensor 129 into a digital signal, to which an image processing is performed.

The image reading apparatus of such configuration includes the reading unit 131. The reading unit 131 is commonly used 1) when the original is conveyed onto the platen glass 119 by the ADF 102 and the original image of the original is read thereafter, and 2) when the original is placed on the platen glass 119 and is read thereafter.

<Control System>

Figure 2:
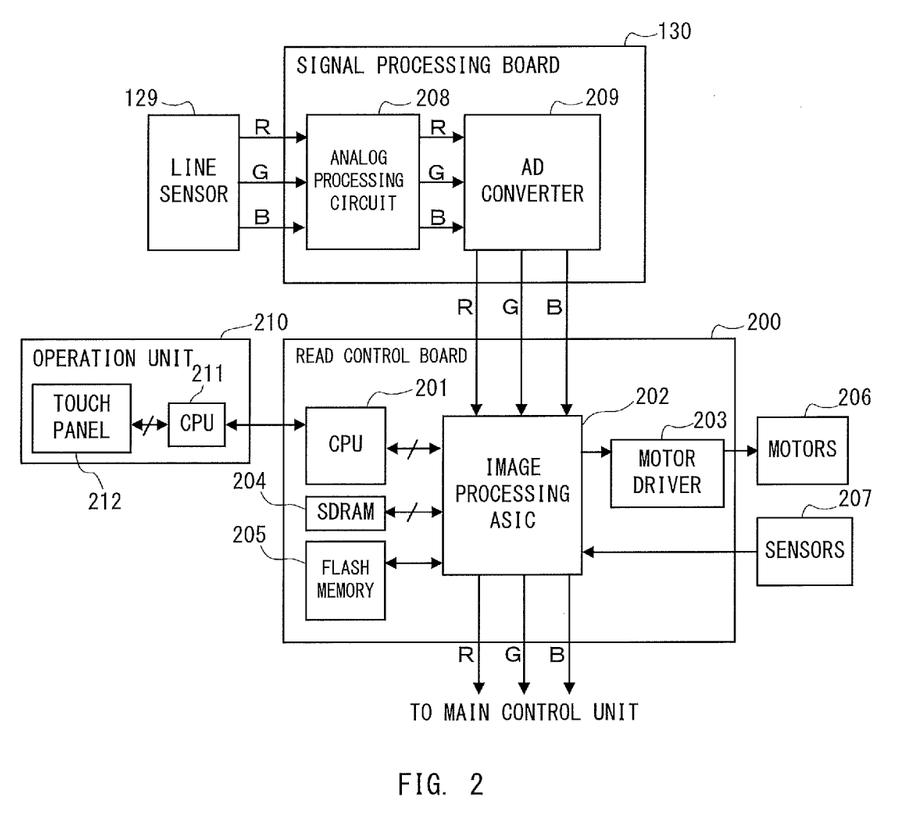
FIG. 2 is a diagram illustrating a configuration of a control unit.

FIG. 2 is a diagram illustrating a configuration of a control unit which comprises the signal processing board 130, a read control board 200 and the like. The control unit controls reading processing of the original image by the image reading apparatus.

The signal processing board 130, which is connected to the line sensor 129, comprises an analog processing circuit 208 and an AD (analog-digital) converter 209. The analog processing circuit 208 obtains the analog electric signal from the line sensor 129 to perform analog processing such as offset, gain adjustment, and the like. The AD converter 209 obtains the electric signal, to which the analog processing is performed, from the analog processing circuit 208. Then, the AD converter 209 converts the electric signal as obtained into the digital image signal. The digital image signal is transmitted to the read control board 200. The analog electric signal and the digital image signal are separated into three colors of RGB and respectively processed for each color.

The processing by the read control board 200 is mainly performed by a central processing unit (CPU) 201 and an image processing application specific integrated circuit (ASIC) 202. In addition, the read control board 200 includes a motor driver 203, a Synchronous Dynamic Random Access Memory (SDRAM) 204 and a flash memory 205. By reading computer programs from a storage medium (not shown) and executing the programs, the CPU 201 and the image processing ASIC 202 control processing which is performed by the image reading apparatus. The read control board 200 supplies control signals to various motors 206 provided to the image reading apparatus and obtains sensor signals from various sensors 207 provided to the image reading apparatus. The image processing ASIC 202 mainly supplies the control signals to the various motors 206. Also, the image processing ASIC 202 mainly obtains the sensor signals from the various sensors 207.

The CPU 201 sets various operations of the image processing ASIC 202. The image processing ASIC 202 performs various image processing to the digital image signals transmitted from the AD converter 209. When image processing is performed, the image processing ASIC 202 receives and transmits various control signals and image signals with the SDRAM 204 to, for example, temporarily store the digital image signals. A part of the image processing parameter and various setting values of the image processing ASIC 202 are stored in the flash memory 205, which are read to the image processing ASIC 202 as necessary. The image data having various image processing performed in the image processing ASIC 202 is transmitted to a main control unit (not shown).

When instructed by the CPU 201 or a sensor signal is input, the image processing ASIC 202 starts an image reading operation. When the image reading operation is started, the image processing ASIC 202 outputs a control pulse of the various motors 206 to the motor driver 203.

The CPU 201 is connected to a CPU 211 in an operation unit 210 by serial communication. The CPU 211 in the operation unit 210 controls input and output information of a touch panel 212 according to an instruction of the CPU 201. The touch panel 212 comprises a display section and an input section. The display section is where the information is output to the user. The input section is where the information from the user is received.

<Document Size Detection Algorithm>

Figure 3:
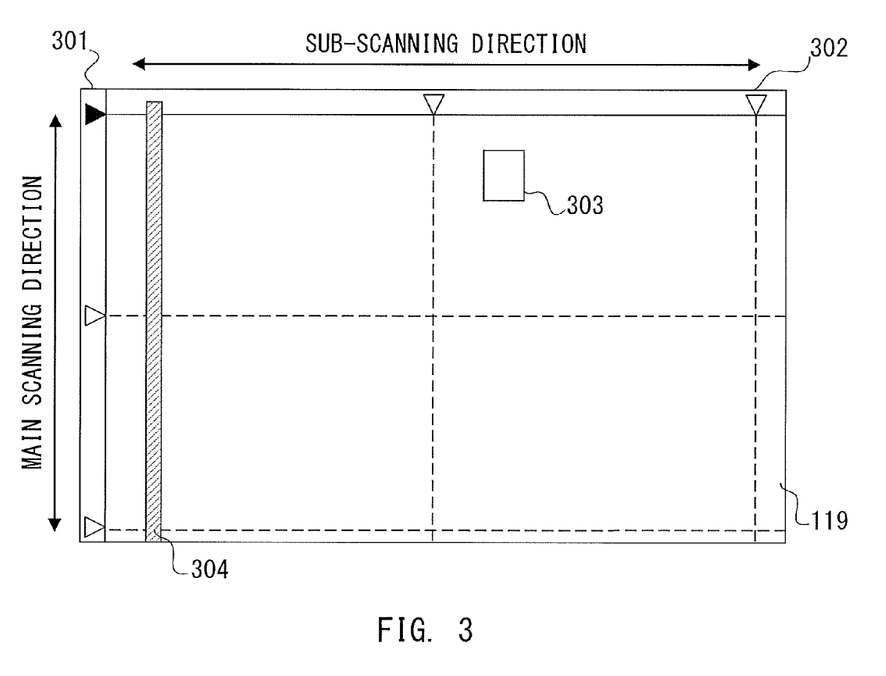
FIG. 3 is a top view of an platen glass.

FIG. 3 is a top view of the platen glass 119 of the image reading apparatus looking from a side of the ADF 102.

An original size label 301 for a main scanning direction and an original size label 302 for a sub-scanning direction are provided on an outer peripheral of the platen glass 119. The "main scanning direction" is a direction in which the reading unit 131 scans when reading the original, which is a depth direction in FIG. 1. The "sub-scanning direction" is a direction in which the reading unit 131 moves along the rail 133 when reading the original, which is a lateral direction in FIG. 1. An original size detection sensor 303 is provided on a predetermined position of the reader unit 101. The original size detection sensor 303 is to detect a size of the original of the sub-scanning direction. Further, a position 304, at which a size of the original of the main scanning direction is detected, is provided.

Figure 4:
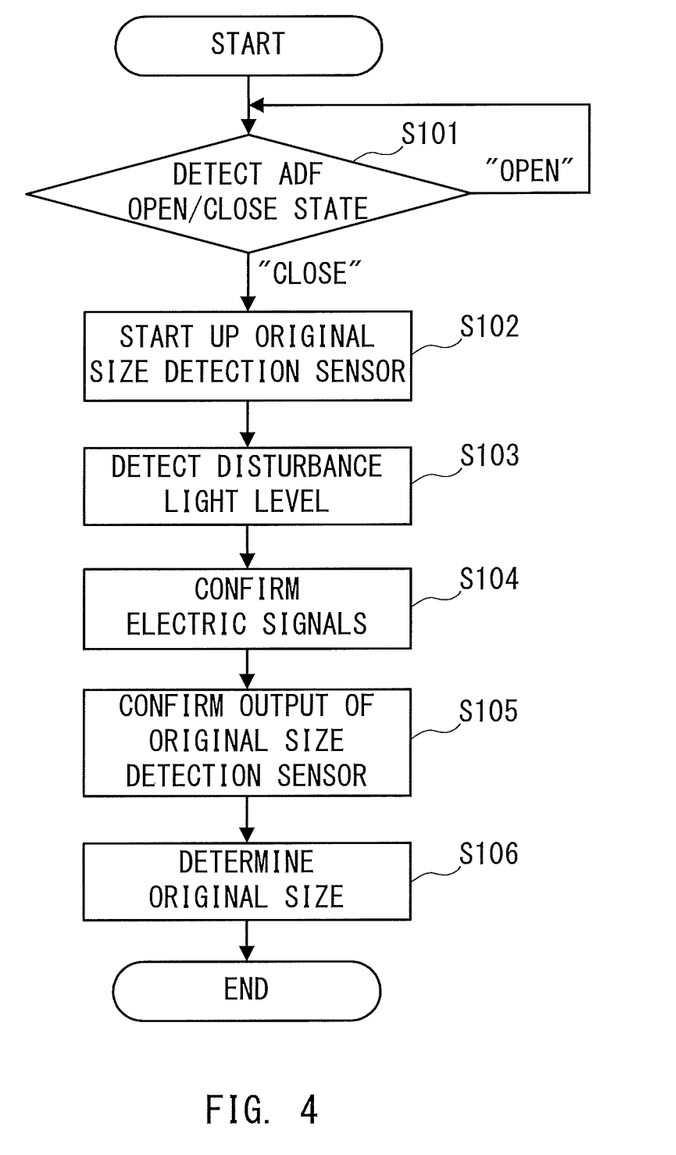
FIG. 4 is a flowchart illustrating original size detection processing.

FIG. 4 is a flowchart illustrating original size detection processing. The image processing ASIC 202 detects an open/close state of the ADF 102 (S101). An ADF open/close detection sensor (not shown) is provided to the ADF 102, which is to detect an angle formed by the ADF 102 and the platen glass 119. The ADF open/close detection sensor detects, for example, that the angle formed by the ADF 102 and the platen glass 119 is 30° or larger. If the angle is 30° or larger, the image processing ASIC 202 detects that the ADF 102 is in an open state (S101: open). If the angle is less than 30°, the image processing ASIC 202 detects that the ADF 102 is in a closed state (S101: close). If the ADF 102 is in the open state, influence of disturbance light is large so that the original size is difficult to determine. If the ADF 102 is in the closed state, influence of disturbance light is small so that in the subsequent original size determination processing, the original size is detected with higher accuracy.

When it is detected that the ADF 102 is in the closed state, the image processing ASIC 202 starts up the original size detection sensor 303 (S102). After starting up the original size detection sensor 303, the image processing ASIC 202 turns the light sources 123 and 124 OFF and obtains the electric signals from the line sensor 129. The image processing ASIC 202 detects a level of the disturbance light from the obtained electric signals and determines the influence of the disturbance light (S103). Among the electric signals of the respective three colors of R (Red), G (Green), and B (Blue) obtained from the line sensor 129, the image processing ASIC 202 selects a color component having a minimum detection level of the disturbance light. Then, using the selected color component, the image processing ASIC 202 determines the influence of the disturbance light.

Figure 5:
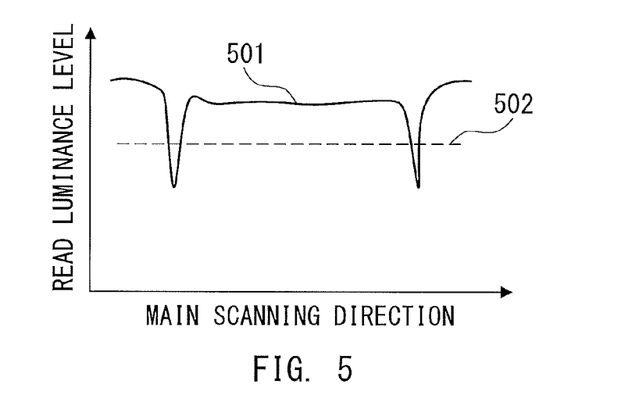
FIG. 5 is a diagram illustrating electrical signals from line sensor.

The image processing ASIC 202 turns the light sources 123 and 124 ON. Then, the image processing ASIC 202 confirms the electric signals from the line sensor 129 at the position 304 (see FIG. 3), at which a size of the original of the main scanning direction is detected (S104). The electric signals from the line sensor 129 are confirmed using the color component having the minimum influence of the disturbance light as determined at S103. FIG. 5 is a diagram illustrating the electric signals from the line sensor 129. FIG. 5 shows point where sensor reads luminance 501, represented by the electric signals, is below a determination threshold value 502. Such point represents the boundary of the original. The image processing ASIC 202 determines that an area between the boundaries is the size of the original of the main scanning direction.

The image processing ASIC 202 confirms a detection state of the original size detection sensor 303 (S105). It means that the image processing ASIC 202 confirms whether or not the original is detected at a position where the original size detection sensor 303 is provided. The image processing ASIC 202 determines a size of the original of the sub-scanning direction based on the detection state of the original size detection sensor 303.

Figure 6:
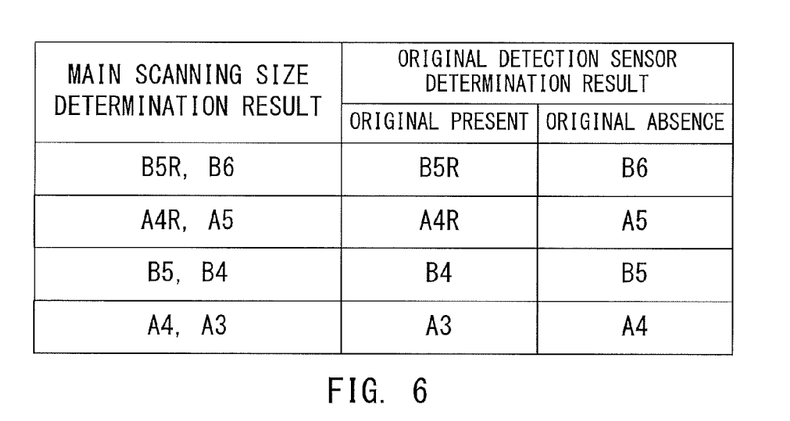
FIG. 6 is a diagram illustrating a table to determine original size.

Based on the electric signals at the position 304 obtained from the line sensor 129 at S104 and the detection state of the original size detection sensor 303 at S105, the image processing ASIC 202 determines the original size (S106). The image processing ASIC 202 determines the original size using, for example, a table shown in FIG. 6. In the table in FIG. 6, "main scanning size determination result" and "original detection sensor determination result" are indicated. The "main scanning size determination result" is determined based on the electric signals obtained from the line sensor 129. The "original detection sensor determination result" is determined based on the detection state of the original detection sensor 303. Using the combination of the two results, the image processing ASIC 202 identifies the original size.

Note that, the image processing ASIC 202 determines that the original is not placed on the platen glass 119 in the following state: (1) as a result of confirming the electric signals from the line sensor 129, the original is found to have no point which is below the determination threshold, which is recognized as the boundary of the original; and (2) the original is not detected by the original size detection sensor 303.

<Blank Determination Algorithm>

Figure 7:
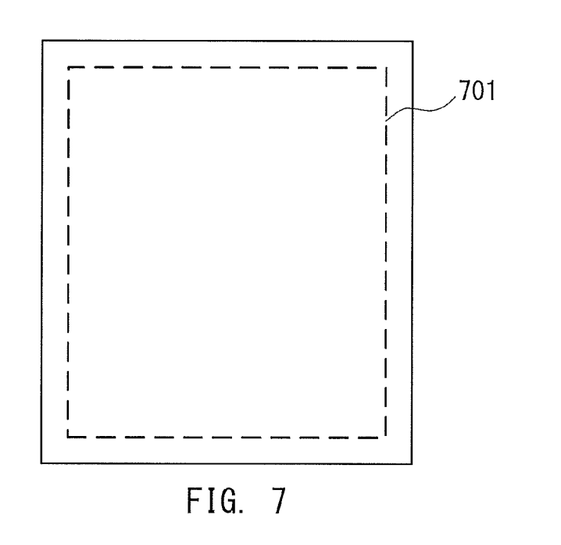
FIG. 7 is an explanatory diagram of an original image and blank determination area.

FIG. 7 is an explanatory diagram of the original image and a blank determination area 701 when the original is read. The reading unit 131 is capable of reading beyond a width of the main scanning direction of the original. An image area used for blank determination is the blank determination area 701, which is the area inside the original as read.

To determine whether or not the original has printing thereon (blank determination), the image reading apparatus needs to determine presence/absence of printing within the blank determination area 701. The setting of the blank determination area 701 is changeable according to the size of the original placed on the platen glass 119, If the blank determination area 701 is set beyond the original size, that is, if the area is set to a range exceeding an actual original size, a shadow is caused at a boundary part of the original and an outside part of the original. The shadow may mistakenly be determined as printing. Further, when dust and the like is adhered to the original, the dust and the like may mistakenly be determined as printing. Further, if the blank determination area 701 is set within the original size, that is, if the area is set to a range smaller than an actual original size, the image reading apparatus mistakenly determines that the original is blank even if there is printing at an end of the original such as a page number, a ruled line and the like, which needs to be determined as printing. Therefore, when performing the blank determination, the image reading apparatus is required to exactly set the blank determination area 701 according to the original size.

Figure 8:
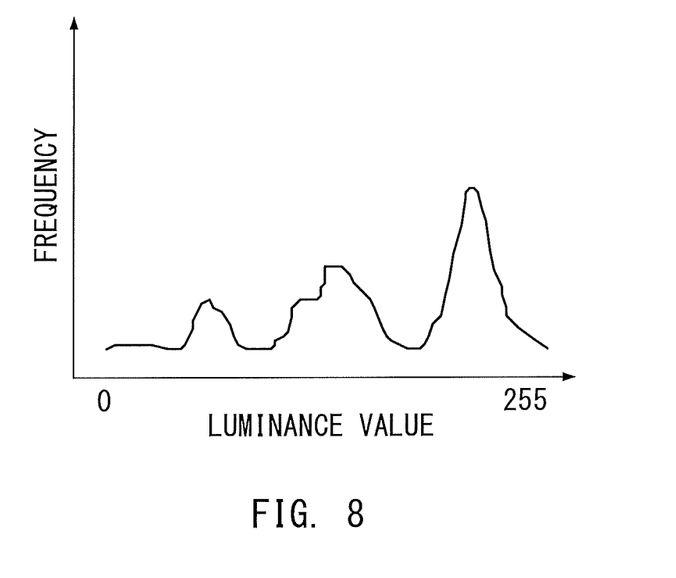
FIG. 8 is a diagram illustrating a histogram of luminance values of an original with printing.

FIG. 8 is a diagram illustrating a histogram of luminance value within the blank determination area 701 of the original with printing. When letters and the like are printed on the original, in addition to a background luminance of the original, printing luminance is included in the histogram. Therefore, as shown in FIG. 8, the frequency in the histogram is dispersed for every luminance so that the peaks of the histogram is represented by several peaks.

Figure 9:
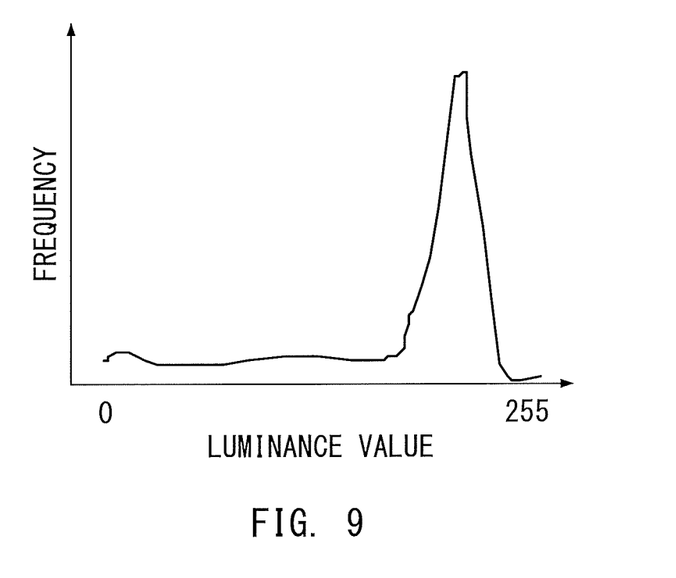
FIG. 9 is a diagram illustrating a histogram of luminance values of an original with no printing.

FIG. 9 is a diagram illustrating a histogram of luminance value within the blank determination area 701 of a blank original without printing. In case of the blank original, as shown in FIG. 9, the frequency in the histogram is concentrated to the background luminance of the original so that the peak of the histogram appears at one luminance value.

Therefore, it is possible to determine whether the original is the printed original or the blank original based on a dispersion value. The dispersion value is obtained by first obtaining the differences between the histogram of max luminance value and the histogram of each luminance in the blank determination area 701 and averaging the obtained values. The averaged value is used as the dispersion value. If the dispersion value is a predetermined value or more, the original is determined to be the printed original. If the dispersion value is less than a predetermined value, the original is determined to be the blank original. For example, if the total number of data of the original image (DATA_NUMBER) used for the blank determination is "70,000,000" and the max value H(MAX) of the histogram of each luminance is "60,000,000", the dispersion value is represented by an expression 1 as follows.

$$\sigma = \{\Sigma \text{Absolute}(H(n) - H(\text{MAX}))\}/\text{DATA\_NUMBER} \ (n = 0\text{-}255)$$
$$= \{\Sigma \text{Absolute}(H(n) - 60{,}000{,}000\}/70{,}000{,}000 \ (n = 0\text{-}255)$$

(expression 1)

In the expression 1, if the data is 8 bits, the luminance value is represented within a range of "0 to 255". Therefore, "n" in within the range of "0 to 255".

Note that, a case is described where the histogram of the image area of the original image including an outside of the original is obtained. In this case, the original image includes not only the original but also the image of the white pressing plate, at the outside of the original, for the platen glass 119 provided opposite to the position 304. If the background color of the original is different from the color of the white pressing plate, the luminance value of the outside of the original differs from that of the background of the original. Due to this, the dispersion value of the histogram becomes high. In this case, even if the original is a blank original with no printing, the dispersion value tends to be high, which hampers an accurate blank determination. Therefore, unless the original area is exactly detected and the image area which is surely inside the original is used for the blank determination, a wrong determination may be caused when performing the blank determination. Then, by executing the original size detection algorithm as above first and executing the blank determination algorithm thereafter, blank determination of higher accuracy can be realized.

<Image Reading Operation>

Figure 10:
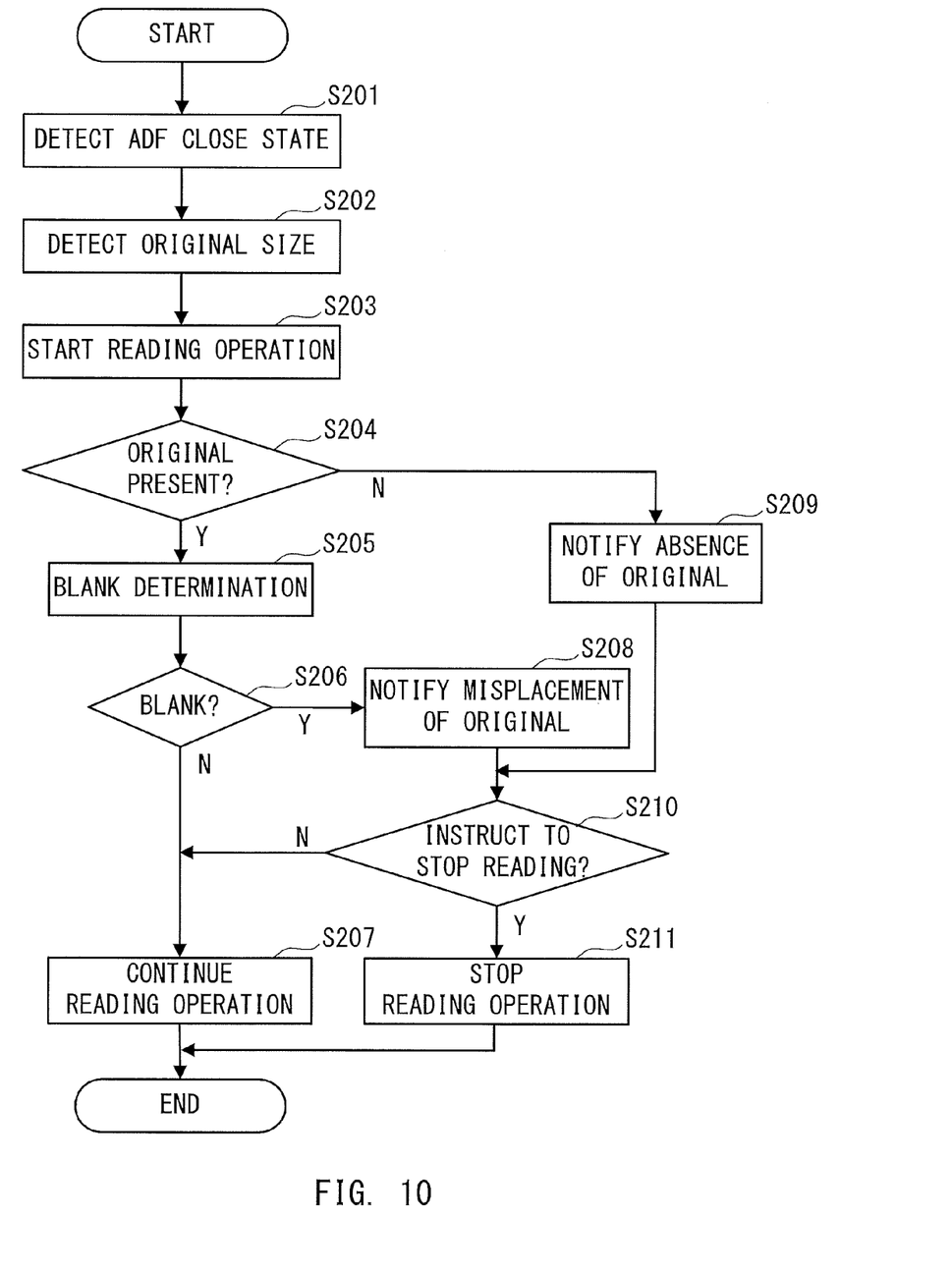
FIG. 10 is a flowchart illustrating image reading processing.

FIG. 10 is a flowchart illustrating an image reading processing performed by the image reading apparatus.

The image processing ASIC 202 detects a close state of the ADF 102 by the ADF open/close detection sensor (S201). This processing is identical to the processing of S101 in FIG. 4. If the ADF 102 is in a close state, the image processing ASIC 202 detects the original size by performing the same processing as the S102 to S106 (S202). Note that even it is determined that the original is not placed on the platen glass 119 during the original size detection process, the image processing ASIC 202 does not notify the user that the original is not placed on the platen glass 119.

When the user instructs to start reading through the operation unit 210, the read control board 200 starts the reading operation of the original (S203). When the reading operation is started, the image processing ASIC 202 determines the presence/absence of the original on the platen glass 119 based on the detection result of the original size at S202 (S204).

If it is determined that the original is on the platen glass 119 (S204: Y), the image processing ASIC 202 reads the original and performs the blank determination (S205). The image processing ASIC 202 performs the blank determination by the blank determination algorithm as mentioned above. If it is determined that the original is not blank (S206: N), the image processing AISC 202 continues reading the image. This is because the original, which is printed, is placed on the platen glass 119 (S207).

Figure 11:
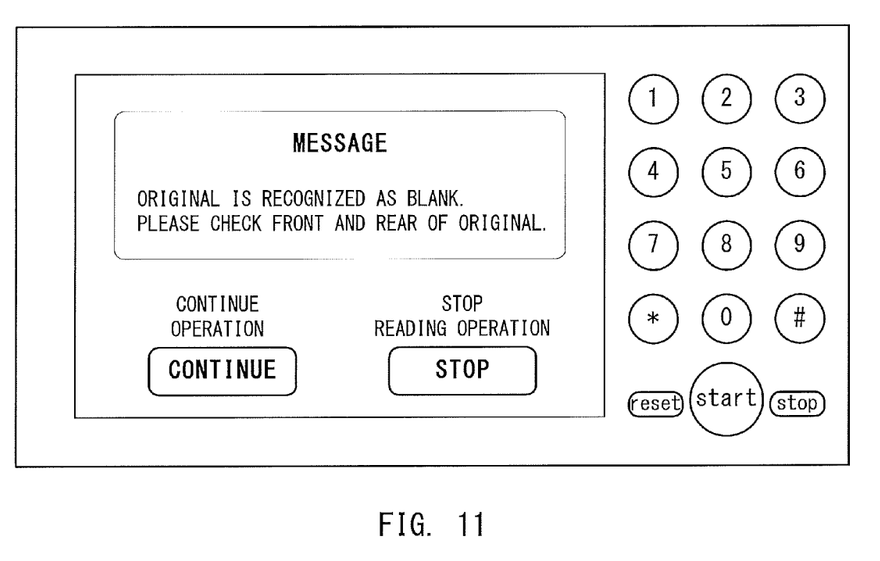
FIG. 11 is a diagram illustrating a notification to a user on a display.

If it is determined that the original is blank (S206: Y), the image processing ASIC 202 notifies the user through the operation unit 210 that the front and rear of the original may mistakenly be reversed. This is because the original which is placed on the platen glass 119 is not printed (S208). FIG. 11 is a diagram illustrating a notification displayed on the display section included in the touch panel 212 of the operation unit 210. Through the display, the user can select whether or not to continue reading the image.

Note that, if it is determined that the original is not on the platen glass 119 at S204 (S204:N), the image processing ASIC 202 determines that the original is not placed on the platen glass 119. Then, the image processing ASIC 202 notifies the user through the operation unit 210 that the original is not placed on the platen glass 119 (S209). Also in this case, a notification similar to that of FIG. 11 is displayed to make the user select whether or not to continue reading the image.

In response to the notifications (S208, S209) through the operation unit 210, the image processing ASIC 202 determines whether or not the user instructs to stop reading the image (S210). If the user instructs to stop reading the image (S210: Y), the image processing ASIC 202 stops reading the original image (S211). If the user does not instruct to stop reading the image (S210: N), the image processing ASIC 202 continues reading the original image (S207).

Through the processing as above, the image processing apparatus detects the presence/absence of the original before performing the blank determination. Due to this, any useless blank determination needs not be performed. Further, if it is determined that the original is blank as a result of the blank determination, the image reading apparatus notifies the user that the original is blank. This suppresses any output of useless blank sheet. As mentioned, the image forming apparatus can inhibit decrease of work efficiency even when the original is blank or the original is failed to be placed.

[Second Embodiment]

An image reading apparatus of the second embodiment does not comprise the original size detection sensor 303. Except for this, a configuration of an image reading apparatus of the second embodiment is identical to that of the first embodiment. Therefore, the description of the configuration of the image forming reading apparatus of the second embodiment is omitted.

Figure 12:
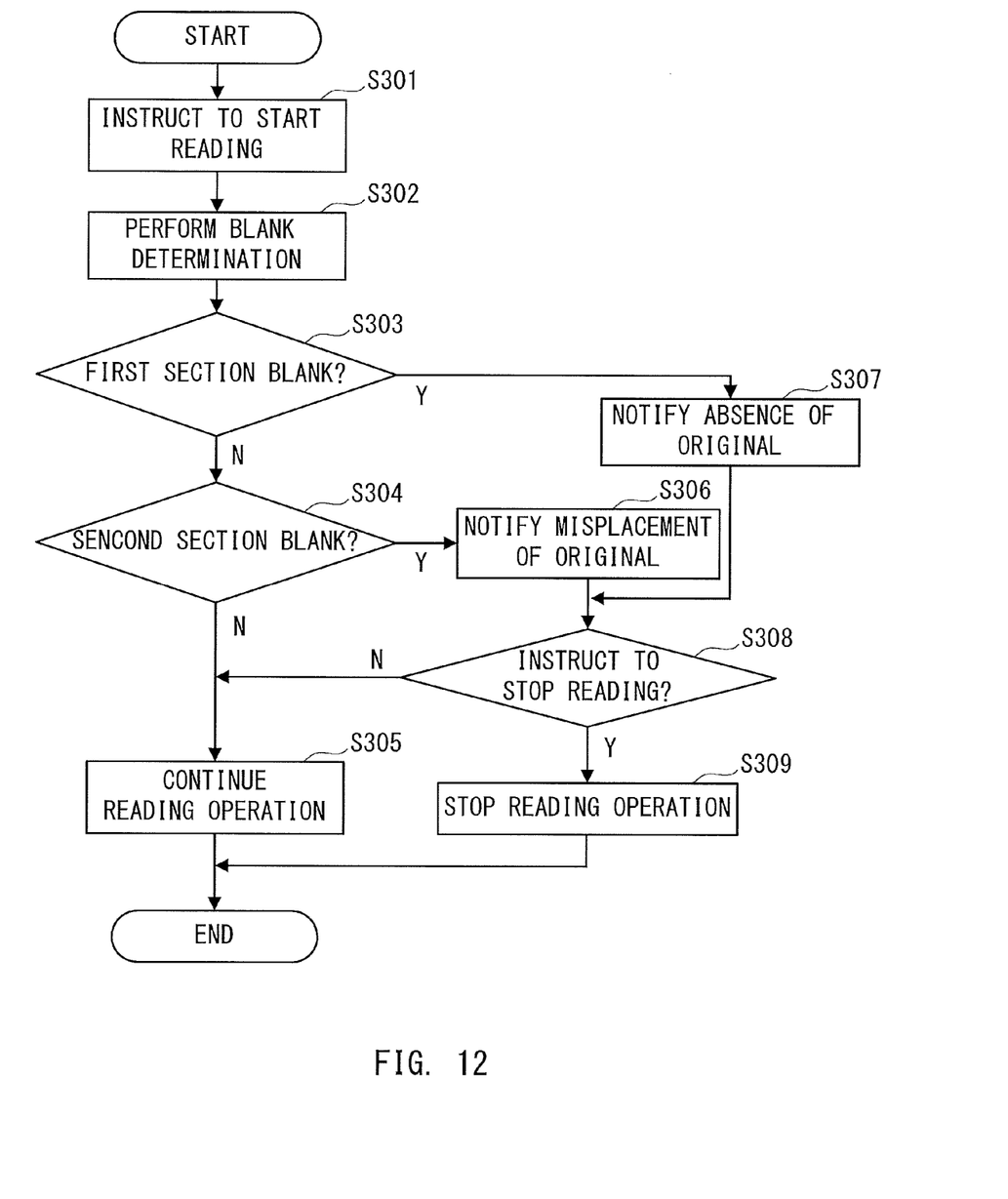
FIG. 12 is a flowchart illustrating image reading processing.

FIG. 12 is a flow chart illustrating an image reading processing when the original size detection sensor 303 is not used.

Figure 13:
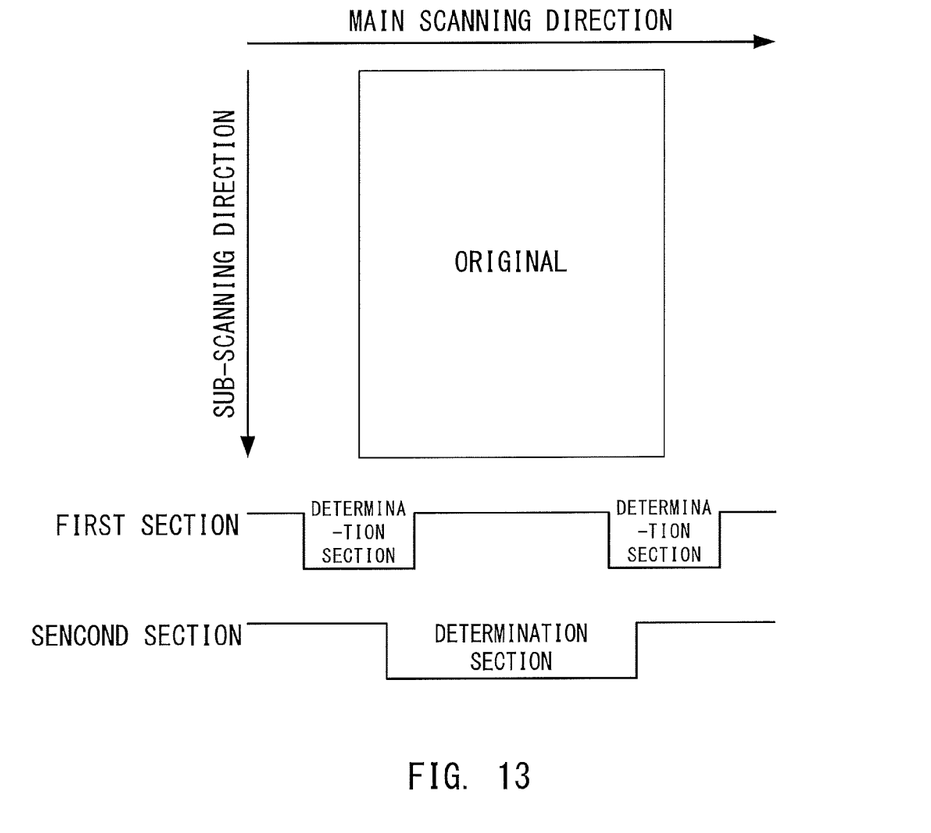
FIG. 13 is an explanatory diagram of a first section and a second section.

When the user instructs to start reading the original image through the operation unit 210 (S301), the image processing ASIC 202 reads the original and performs the blank determination (S302). Dividing the original into two sections in the main scanning direction of the original, the image processing ASIC 202 performs the blank determination. As shown in FIG. 13 for example, the image processing ASIC 202 performs the blank determination separately in a first section and in a second section.

The first section is an area defined by a boundary part of the original placed on the platen glass 119 and the outside of the original. The image processing ASIC 202 monitors whether the area is detected or not. The second section is an area where the original on the platen glass 119 is supposedly placed. Note that the first section and the second section may partially be overlapped.

The blank determination in the first section is performed whether the boundary part of the original is detected or not. A shadow is caused at the boundary part of the original. By detecting the shadow as a change in color, the image processing ASIC 202 detects the boundary part of the original. If the boundary part of the original is not detected, the image processing ASIC 202 determines that the original is blank. If the boundary part of the original is detected, the image processing ASIC 202 determines that the original is not blank. If the boundary part is not detected (original is blank), the image processing ASIC 202 determines that the original is not placed on the platen glass 119. If the boundary part is detected, the image processing ASIC 202 determines that the original is placed on the platen glass 119.

If it is determined in the first section that the original is blank (S303: Y), the image processing ASIC 202 notifies the user that the original is not placed on the platen glass 119 (S307). This is notified to the user in a manner similar to that in S209 of FIG. 10.

If it is determined in the first section that the original is not blank (S303: N), the image processing ASIC 202 performs the blank determination of the second section (S304). The image processing ASIC 202 determines the presence/absence of printing in the second section. If there is no printing in the second section, the image processing ASIC 202 determines that the original is blank. If there is printing, the image processing ASIC 202 determines that the original is not blank. If it is determined in the second section that the original is blank (S304: Y), the image processing ASIC 202 notifies the user that the front and rear of the original may mistakenly be reversed (S306). This is notified to the user in a manner similar to that in S208 of FIG. 10.

If it is determined in the second section that the original is not blank (S304: N), the image processing ASIC 202 continues reading the image. This is because the original, which has printing, is placed on the original table 119 (S305).

In response to the notifications (S307, S306) through the operation unit 210, the image processing ASIC 202 determines whether or not the user instructs to stop reading the image (S308). If the user instructs to stop reading the image (S308: Y), the image processing ASIC 202 stops reading the original image (S309). If the user does not instruct to stop reading the image (S308: N), the image processing ASIC 202 continues reading the original image (S306).

Through the above mentioned processing, the image reading apparatus needs not perform any useless blank determination and can suppress any output of useless blank sheet. Thus, the image forming apparatus can inhibit decrease of work efficiency even when the original is blank or the original is failed to be placed. Since the image reading apparatus of the second embodiment does not comprise the original size detection sensor 303, the accuracy of the blank determination may be declined, however, the cost can be reduced as compared to the image reading apparatus of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075298, filed Apr. 1, 2014 which is hereby incorporated by reference wherein in its entirety.

What is claimed is:

1. An image reading apparatus, comprising:
    a reading unit configured to read an image of an original placed on a platen glass, and to output image data of the image;
    a processor and a memory;
    a cover which is openably and closably provided to the platen glass;
    a detector configured to detect open state/close state of the cover with respect to the platen glass;
    a sensor configured to detect whether the original is placed at a predetermined position of the platen glass, responsive to a detection of a close state of the cover;
    a determination unit configured to determine presence/absence of the original on the platen glass and to determine a size of the original based on a detection result of the sensor and on the image data output from the reading unit;
    a blank determination unit configured to determine whether the original is blank or not based on the image data within a determination area which is changeable according to the determined size of the original, responsive to an instruction to start reading of the original by the reading unit; and
    a control unit configured to cause a display to display information which indicates that the original is not on the platen glass responsive to a determination by the determination unit of the absence of the original on the platen glass and configured to cause a display to display information corresponding to the original being blank responsive to a determination by the determination unit of the presence of the original on the platen glass and a determination by the blank determination unit that the original is blank;
    wherein the processor and the memory operate to function as the determination unit, the blank determination unit, and the control unit.

2. The image reading apparatus according to claim 1, further comprising an input unit configured to receive an instruction from the user, wherein, when the input unit receives an instruction to stop reading operation, the reading unit is configured to stop reading the image.

3. The image reading apparatus according to claim 1, wherein the blank determination area is an area which is set, according to the size of the original, inside an area in which the reading unit reads an image.

4. The image reading apparatus according to claim 3, wherein the blank determination unit is further configured to determine whether the original is blank or not according to a value which is obtained by averaging differences in histograms of luminance values within the blank determination area.

5. A method for controlling an image reading apparatus having a reading unit which reads an image on an original placed on a platen glass and outputs image data of the image, comprising:
    detecting whether a cover, which is openably and closably provided to the platen glass, is in an open state or a close state with respect to the platen glass;
    detecting whether the original is placed at a predetermined position of the platen glass, responsive to a detection of the close state of the cover;
    determining presence/absence of the original on the platen glass and determining a size of the original based on a detection that the original is placed at the predetermined position of the platen glass, and based on the image data output from the reading unit;
    responsive to an instruction to start reading of the original by the reading unit, determining whether the original is blank or not based on the image data within a determination area which is changeable according to the determined size of the original; and
    causing a display to display information which indicates that the original is not on the platen glass responsive to a determination by the determining step of the absence of the original on the platen glass, and causing a display to display information corresponding to the original being blank responsive to a determination by the determining step of the presence of the original on the platen glass and a determination by the blank determining step that the original is blank.

6. The method according to claim 5, further comprising:
    stopping, by the image reading apparatus, reading of the image by the reading unit when the input unit receives an instruction to stop reading operation.

7. The image reading method according to claim 5, further comprising:
    wherein the blank determination area is an area set inside the area read by the reading unit according to the size of the original.

8. The image reading method according to claim 7, further comprising:
    determining whether the original is blank or not according to a value in which differences in histograms of luminance values within the blank determination area are averaged.

9. A non-transitory computer readable storage medium containing a computer program for causing a computer, which includes a reading unit to read an image of an original placed on a platen glass and to output image data of the image, to execute:
    processing for detection of whether a cover, which is openably and closably provided to the platen glass, is in an open state or a close state with respect to the platen glass;
    processing for detection of whether the original is placed at a predetermined position of the platen glass, responsive to a detection of the close state of the cover;
    processing to determine presence/absence of the original on the platen glass and to determine a size of the original based on a detection that the original is placed at the predetermined position of the platen glass, and based on the image data output from the reading unit;
    responsive to an instruction to start reading of the original by the reading unit, processing to determine whether the original is blank or not based on the image data within a determination area which is changeable according to the determined size of the original; and
    processing to display information which indicates that the original is not on the platen glass responsive to a determination of the absence of the original on the platen glass, and to display information corresponding to the original being blank responsive to a determination of the presence of the original on the platen glass and a determination that the original is blank.

* * * * *